INVENTORS
ROBERT B. BLIZARD
CHRIST W. PEDERSON
JOHN T. POLHEMUS
BY
*Gary D. Fields*
ATTORNEY Dec. 15, 1970   R. B. BLIZARD ET AL   3,548,378
INTEGRATED PARAMETER DISPLAY OF GALVANOMETER READING
Filed Feb. 3, 1966   7 Sheets-Sheet 2

INVENTORS
ROBERT B. BLIZARD
CHRIST W. PEDERSON
JOHN T. POLHEMUS
BY Gary D. Fields
ATTORNEY INVENTORS
ROBERT B. BLIZARD
CHRIST W. PEDERSON
JOHN T. POLHEMUS
BY *Gary D. Fields*
ATTORNEY

TO KEYBOARD ADDRESS COMPARATOR
& TO DIGITAL ADDRESS COMPARATOR

INVENTORS
ROBERT B. BLIZARD
CHRIST W. PEDERSON
BY  JOHN T. POLHEMUS

*Gary D. Fields*
ATTORNEY

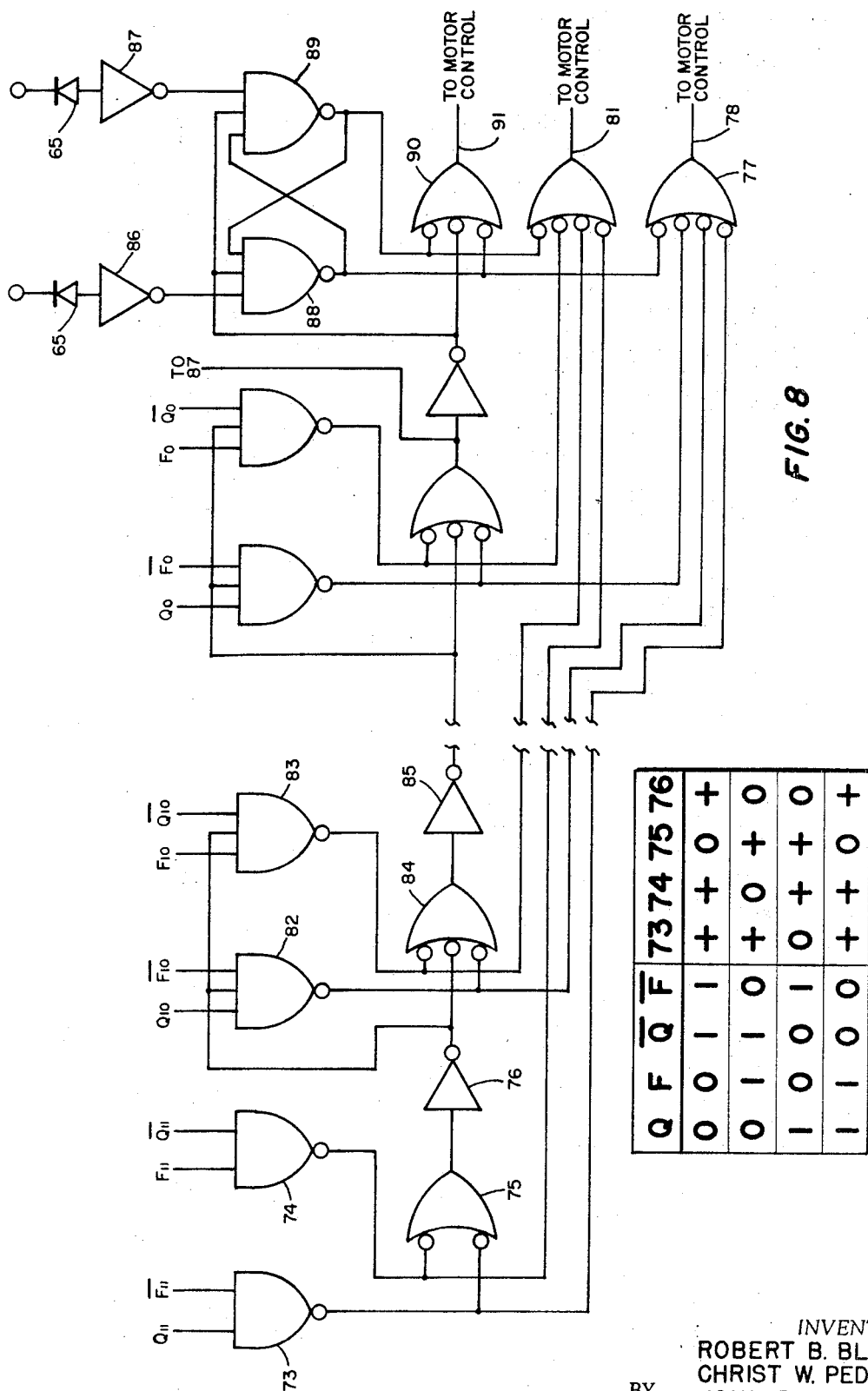

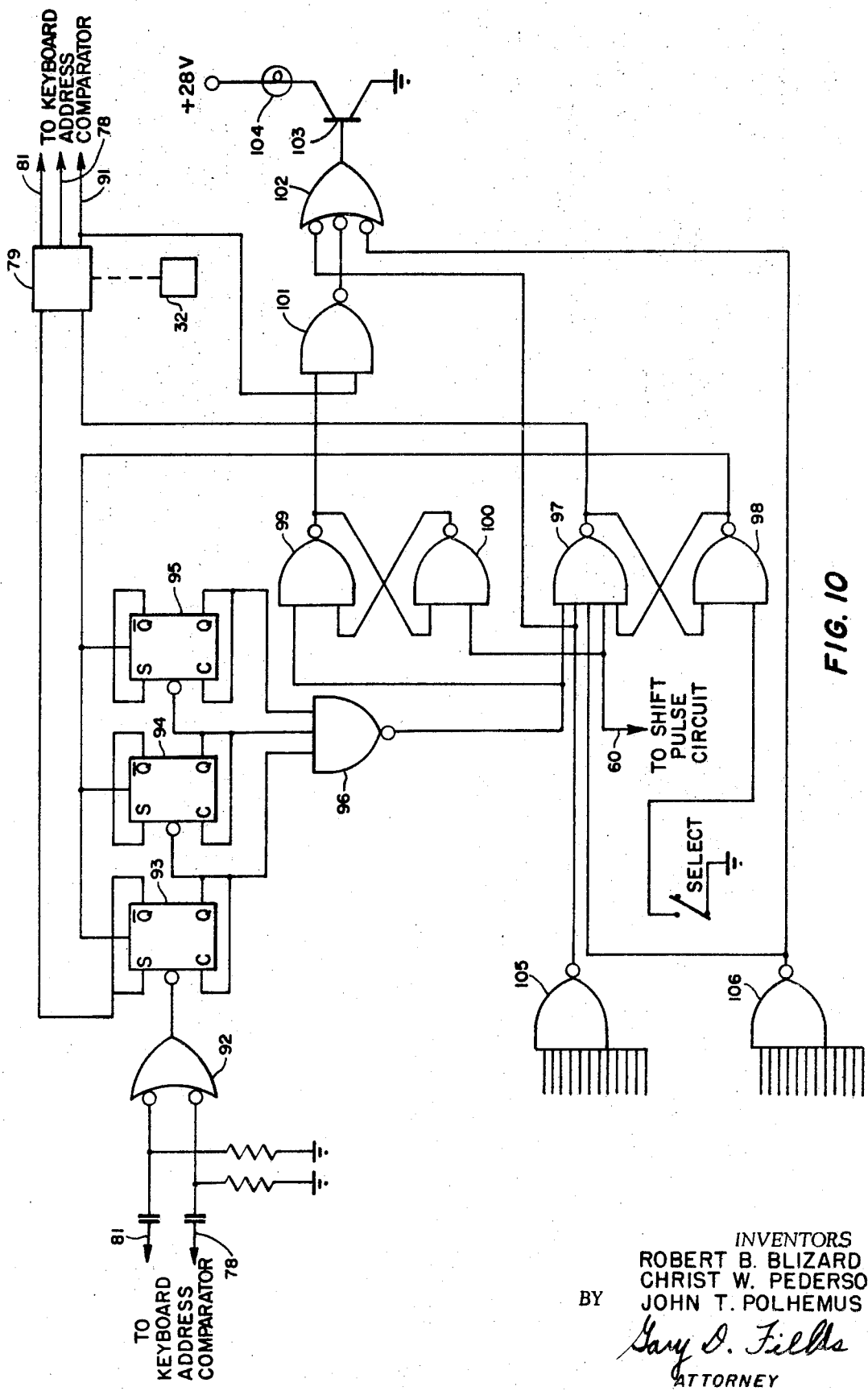

United States Patent Office 3,548,378
Patented Dec. 15, 1970

3,548,378
INTEGRATED PARAMETER DISPLAY OF
GALVANOMETER READING
Robert B. Blizard and Christ W. Pederson, Littleton, and John T. Polhemus, Englewood, Colo., assignors to Martin-Marietta Corporation, New York, N.Y., a corporation of Maryland
Filed Feb. 3, 1966, Ser. No. 524,911
Int. Cl. H04q 9/00
U.S. Cl. 340—151                    11 Claims

ABSTRACT OF THE DISCLOSURE

The integrated parameter display operates with a programmer and multiplexer to display an unlimited number of meters. The meter faces are provided on a film strip which are selectively projected onto a screen. The meter reading is superimposed on the selected meter face by a galvanometer in accordance with the value of a parameter being measured. The meter faces are placed on a film strip with a coded address adjacent thereto. The desired address is punched into a keyboard and compared with the film strip being driven until the selected address matches the address adjacent the meter face to be displayed.

---

This invention relates to a multiple meter display or integrated parameter display. More particularly, the invention relates to a device for displaying any one of a plurality of meter faces upon a viewing screen.

As the aerospace technology becomes more sophisticated, it is necessary for the pilot of an aircraft or spacecraft to be provided with an ever increasing number of meter readings so that he can properly monitor the various functions of his vehicle. However, because of size and weight limitations, the number of meters that can be included in such an aircraft or spaceship is limited. Also, the cost of such a large number of meters may be prohibitive. With respect to ground equipment used in support of aircraft and spacecraft, the number of meters needed may be even greater than in the aircraft or spacecraft itself since it may be desirable to monitor many additional functions of the craft which are not essential for the pilot's operation thereof, but are nevertheless of significance. Again, such a large number of meters become almost prohibitive both from a space standpoint and from a cost standpoint. Thus, it can be seen that because of limitations of space, weight and cost, a new arrangement for meter display is clearly needed.

Among the objects of this invention are to provide a multiple meter or integrated parameter display; to provide such a display in which virtually an unlimited number of meters may be displayed as required; to provide such a display in which the meter faces are placed on a film strip for projection onto a screen; to provide such a display in which any one of the meter faces may be displayed on the screen rapidly; to provide such a display which may be connected to a conventional programmer and multiplexer for sampling data; to provide such a display in which a data stream address is compared with the address on the screen of the display, and when they match, the data from the multiplexer is utilized to control a galvanometer which indicates on the screen the value of the data being monitored; to provide such a display in which the galvanometer is a mirror galvanometer which projects a light beam on the screen to give a visual indication of the value of the data being monitored; to provide such a display in which the meter face displayed is chosen by punching an address into a keyboard address selector and register; to provide such a display in which the address for each meter face is placed on the film strip next to each meter face; to provide such a display in which the selected address is compared with the address for the meter face being displayed; to provide such a display in which film drive means is provided to cause a meter face to be displayed whose address matches the selected address; to provide such a meter display in which the address is placed on the film strip next to the meter face; to provide such a display in which rapid updating of each meter reading may be provided; to provide such a meter in which the updating interval may vary for each meter; to provide such a display in which additional meter faces may be added or removed from the film strip; to provide such a meter display in which either analog or discrete readings may be provided; and to provide such a meter display which is fast and efficient in operation.

Additional objects and novel features will become apparent from the description which follows, taken in conjunction with the accompanying drawings, in which:

FIG. 8 is a partial circuit diagram of the keyboard address comparator used in conjunction with this invention;

FIG. 9 is a truth table for explaining the operation of the circuit of FIG. 8; and FIG. 10 is a circuit diagram of the various motor control circuits.

Figure 1:
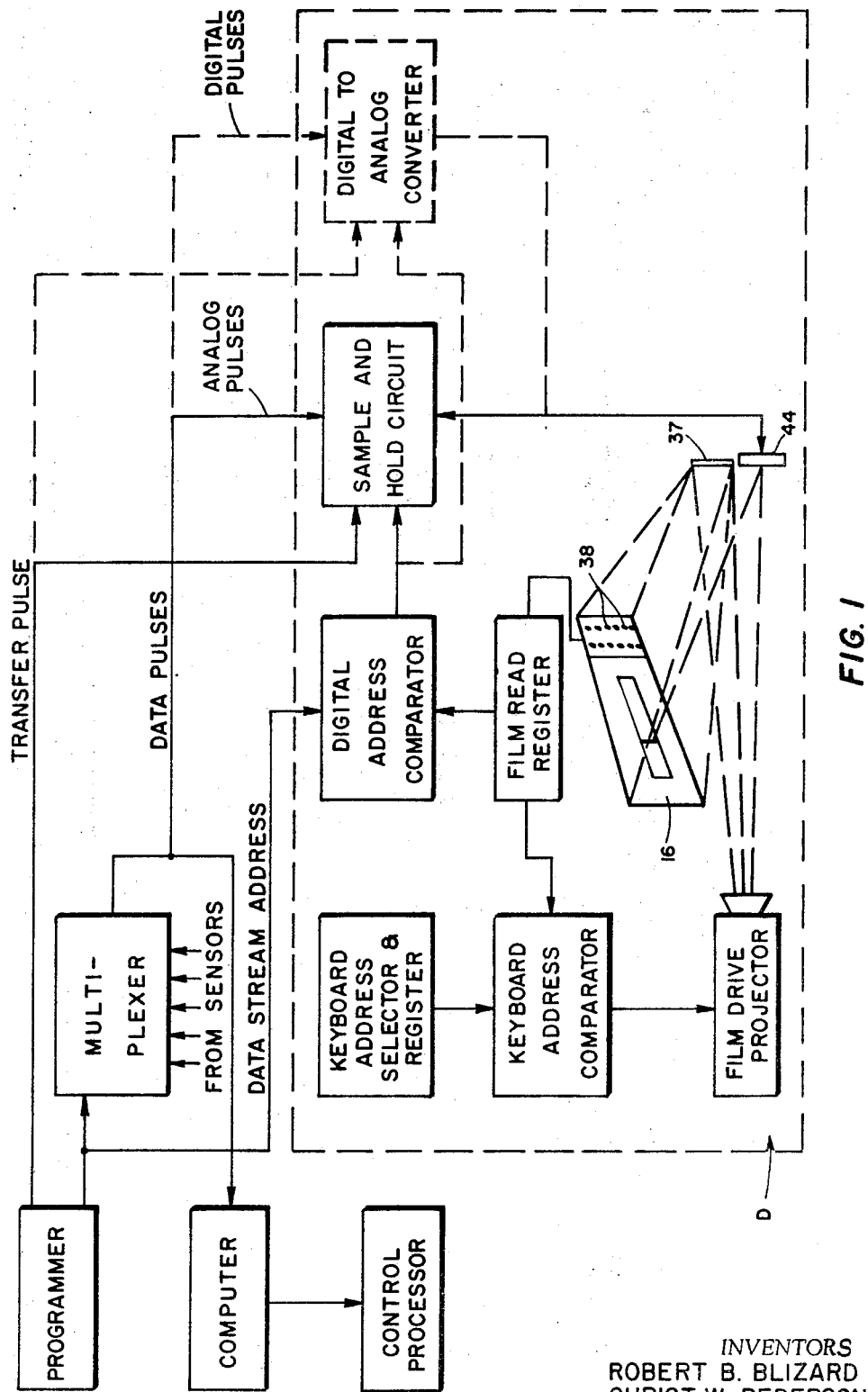
FIG. 1 is a diagrammatic illustration of the elements which make up the integrated parameter display of this invention showing their inter-relationship with each other and with a conventional data monitoring system.

In accordance with this invention, it is contemplated that the multimeter display system which may also be referred to as integrated parameter display system may be utilized with either airborne or ground equipment for aircraft, missiles and spacecraft for providing a substantially instantaneous reading of any one of many thousands of parameters being studied. As seen in FIG. 1, the conventional data gathering system comprises a programmer which sends signals into a multiplexer indicating which of the many sensors connected to the multiplexer is desired to be read at a particular time. The multiplexer then sends a signal from the particular sensor to be read to a computer which in turn transfers the information to a control processor. This information is stored in the control processor to be studied at a later date, as required. Although only one multiplexer is shown, it will be understood that the programmer may be connected to many multiplexers which in turn receive signals from many sensors, the total number of sensors in a particular system may be many thousands. However, it can be seen that where an instantaneous reading of a particular parameter is desired, it would be necessary to provide a separate meter for each reading which is to be observed. Obviously, where several thousand parameters are being measured, it is physically impossible to provide a separate meter so that each of these parameters can be instantaneously observed. Also, it will be very difficult for a person to observe such a large number of meters even if this number could be provided. The problems are compounded with respect to airborne equipment because the size, weight and expense of the equipment involved becomes prohibitive.

With the integrated parameter display D of this invention, the faces of the many thousands of meters to be read are placed on a film strip which can display any one of the faces on a screen within a short time period, such as two seconds or less. The data which provides the reading for the meter is periodically updated, as discussed below. As can be seen from FIG. 1, the data stream address is fed into a digital address comparator directly from the programmer and the data pulses from the multiplexer are fed into a sample and hold circuit. The operator of the integrated parameter display punches an address such as a four digit octal number into a keyboard address selector and register which in turn feeds this information into a keyboard address comparator. The comparator compares the address fed into it with the address on the film adjacent the meter face being displayed on the screen as supplied by the film read register. If these two addresses do not match, the film drive is activated to drive the film to a position such that the correct meter face is projected onto the screen. A signal indicative of the particular meter face being displayed on the screen is transmitted by the film read register to the digital address comparator which in turn feeds the correct information from the data stream address for that particular meter displayed on the screen to the sample and hold circuit. The sample and hold circuit then reads the data from the data pulses supplied to it by the multiplexer which correspond with the meter face being displayed and this information in analog form is fed to a mirror galvanometer which projects a light bar onto the image of the meter face on the screen to give a meter reading.

The multiplexer or other data source could supply digital data information in addition to or instead of analog data pulses. In this case, a digital to analog converter would be utilized in addition to or instead of the sample and hold circuit, as shown in dotted lines in FIG. 1.

Figure 2:
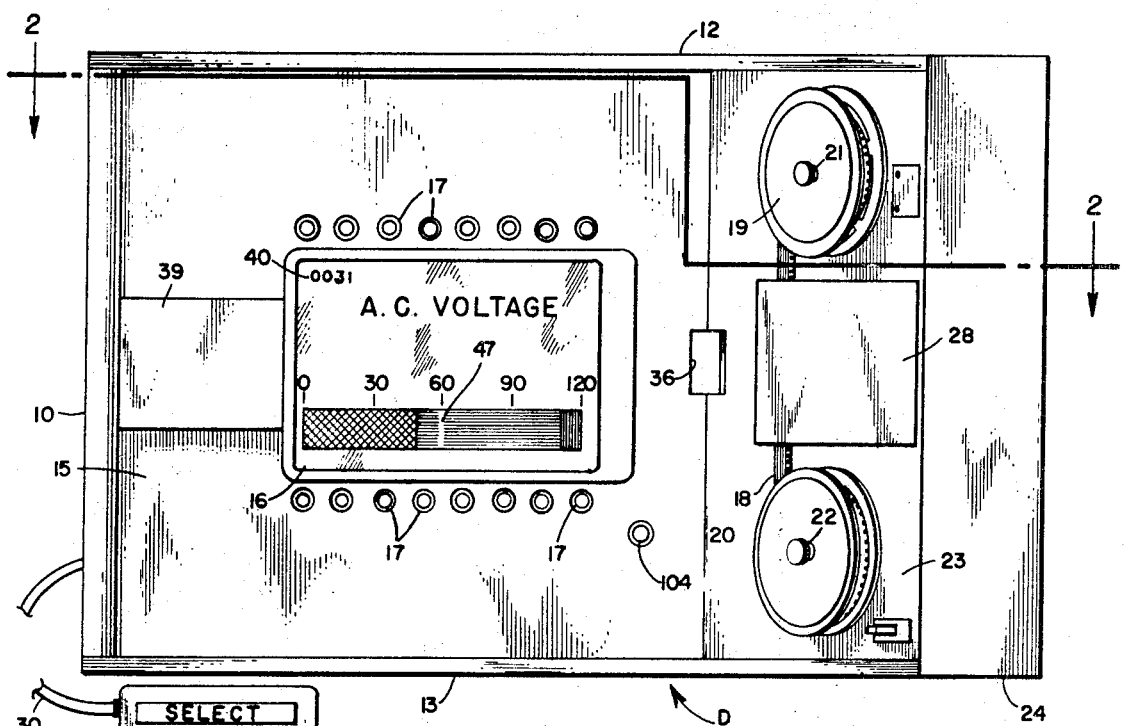
FIG. 2 is a front elevation of the integrated parameter display of this invention.
Figure 4:
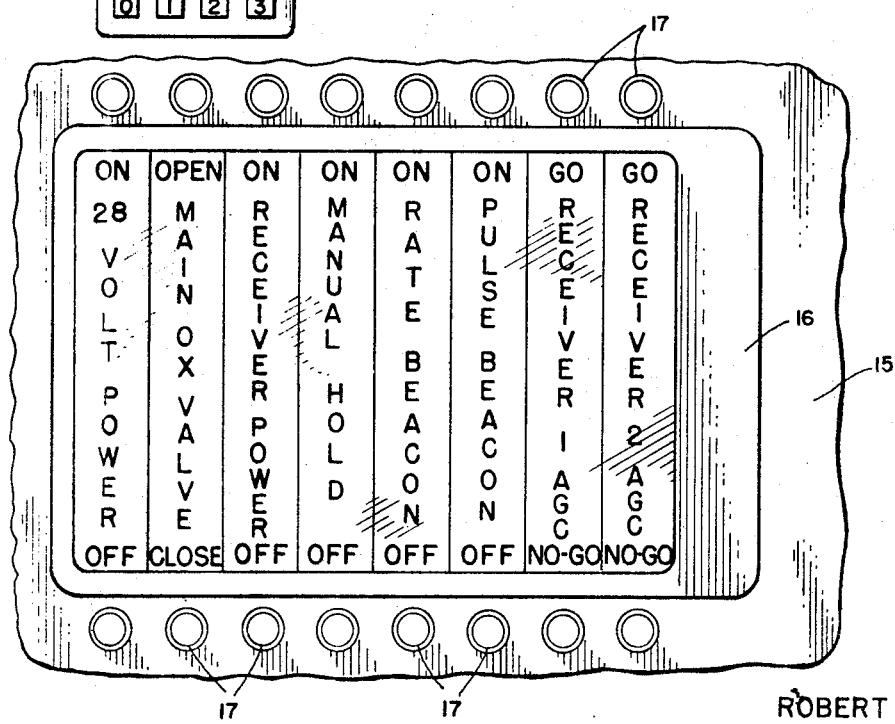
FIG. 4 is a fragmentary front elevation on an enlarged scale, showing an alternative meter face for discrete readings.
Figure 3:
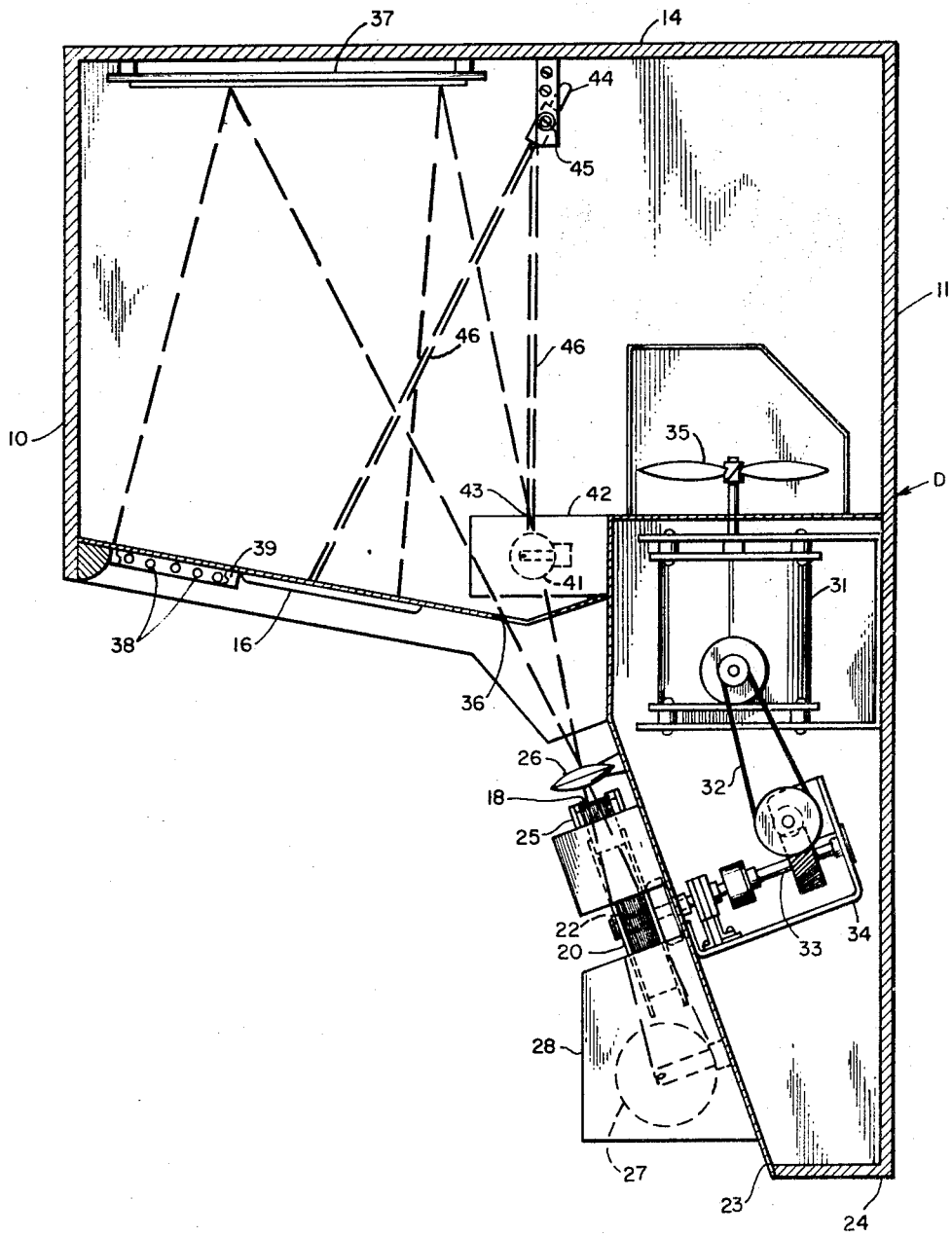
FIG. 3 is an offset horizontal section taken along line 2—2 of FIG. 1 to show some of the internal details of the integrated parameter display.

As seen in FIGS. 2 and 3, the integrated parameter display D may be mounted in a housing having sidewalls 10 and 11, top and bottom walls 12 and 13 and a rear wall 14. A front wall 15 has a viewing screen 16 mounted therein provided with a row of eight lights 17 above and below the screen. These lights are used when a discrete reading is desired as will be more fully described below in connection with FIG. 4. It will be understood that the lights 17 can be arranged in vertical rows along the sides of screen 16 rather than in horizontal rows across top and bottom, as desired. The number of lights may be varied as described below, eight lights being shown for illustrative purposes only.

Conveniently, a film strip 18 is mounted on a pair of spools 19 and 20 which are mounted on spindles 21 and 22 attached to a diagonal wall 23 which extends between front wall 15 and a front edge 24. The film 18 is fed through a film guide 25 mounted between the spools and directly behind a lens 26 but in front of a light 27 mounted in a housing 28 on diagonal wall 23. The particular meter to be read is selected by punching a four digit address into a keyboard 29 which is connected to the address register by suitable wiring 30. Of course, it will be understood that the keyboard may be mounted directly in the case for display D, if desired. In a manner to be described, this action energizes motor 31 of FIG. 3 which, through a pulley 32, causes drive mechanism 33 mounted on bracket 34 to drive the film in one direction or the other until the proper meter face image is positioned between the light and the lens. In order to provide adequate cooling for the housing a fan 35 is attached to motor 31.

The film image is projected through an opening 36 in front wall 15 to the right of screen 16. The image is reflected off a mirror 37 mounted on rear wall 14 onto screen 16. It will be noted that a portion of the image does not strike the screen but is directed against a photo diode array comprising a plurality of photo diodes 38 mounted in a housing 39. In addition to the meter face image, a coded address is placed on the film next to the meter face, as discussed more fully below in connection with FIG. 6. Thus, certain of the photo diodes will be activated in response to the light transmitted through the address portion of the film so that a comparison may be made between the address of the meter face being displayed with the address which has been punched into the keyboard 29. When the film address matches the address punched on the keyboard, the motor will be deenergized so that the image of the desired meter face will be projected on screen 16 for viewing. Conveniently, the digital address 40 may be placed on the meter face as shown in FIG. 2, so that the operator may verify that he punched the correct address into the keyboard.

In addition, a second light source 41 is provided within a box 42 which is mounted in the case to the left of opening 36 and focused through a slit 43 onto the mirror galvanometer 44. The mirror galvanometer pivots about a pivot 45 in response to a signal representing the particular value of the parameter being measured as supplied by the multiplexer of FIG. 1. Thus, the light beam 46 from box 42 is reflected by the mirror galvanometer 44 onto screen 16, as shown in FIG. 3 to provide a light bar 47 as shown in FIG. 2 to indicate the meter reading.

For some indications, a discrete reading is more useful than an analog reading. For example, sometimes it is only necessary to know whether a particular valve is open or closed, a particular switch on or off, etc. In that case, the film strip may carry an image of the type shown in FIG. 4 in which eight conditions may be read by observing lights 17. The number of discrete readings which may be placed on one meter face is limited only by the number of bits in each data word from the data stream. A meter face for an 8 bit data word has been shown for illustrative purposes.

Figure 5:
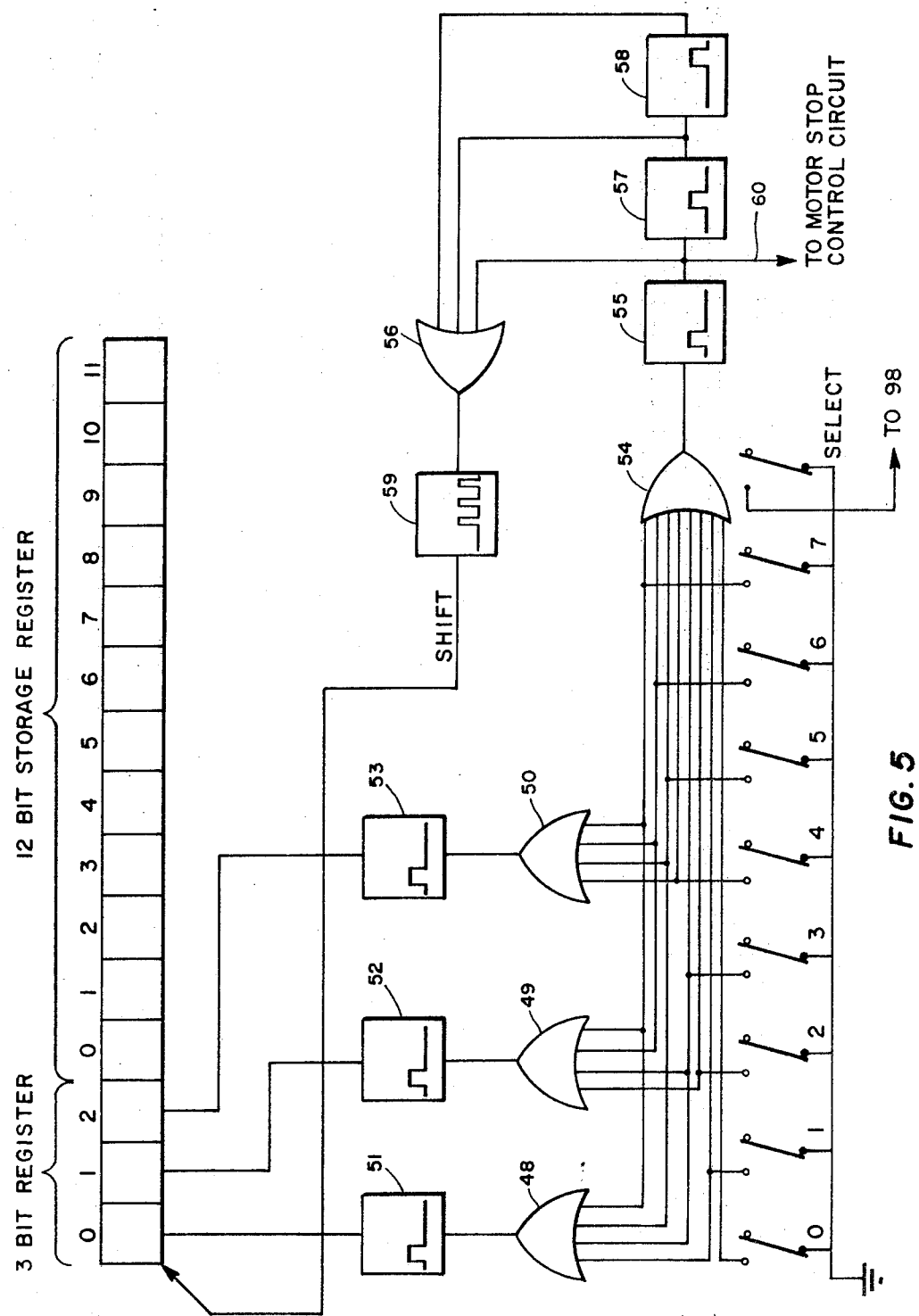
FIG. 5 is a circuit diagram of a keyboard address selector and register utilized in this invention.

The keyboard address selector and register shown in FIG. 1 and partially represented by keyboard 29 in FIG. 2 may be more fully understood by reference to FIG. 5. The keyboard address selector converts a 4 digit octal address to a 12 bit binary address and stores this address in a 12 bit register. The 8 switches numbered 0 to 7 on the keyboard are connected to three OR gates 48, 49 and 50 which in turn are connected to three single-shot-circuits 51, 52 and 53 respectively. Thus, when a key is depressed, the digit is converted to a three bit binary word and this word is direct-set into a three bit register. The wave pulses generated by the single-shot-circuits 51, 52 and 53 are schematically shown thereon. In addition, three shift pulses are also generated each time a number on the keyboard is depressed to shift the three bit binary word into the 12 bit storage register. Thus, a signal is transmitted through OR gate 54 to single-shot-circuit 55 which sends a signal, having the wave form shown, to OR gate 56 and to single-shot-circuit 57. The second pulse is generated by a single-shot-circuit 57 which pulse is sent to OR gate 56 and single-shot-circuit 58. Finally, single-shot-circuit 58 generates a pulse which is fed into OR gate 56. The three pulses which are fed into OR gate 56 result in three short pulses being generated by single-shot-circuit 59, as shown, resulting in a three digit shift of the 3 bit binary word from the 3 bit register into the 12 bit storage register. It will be noted from FIG. 5, that the pulse of single-shot-circuit 55 is longer than any of the pulses from single-shot-circuits 51, 52 and 53 so that no shift pulses will be generated by single-shot-circuit 59 until the 3 bit binary word has been set in the 3 bit register. The end of the pulse from single-shot-circuit 55 initiates the shorter pulses of single-shot-circuits 59 and 57. Similarly, the end of the pulse from single-shot-circuit 57 initiates the pulses of single-shot-circuits 59 and 58. The end of the pulse of single-shot-circuit 58 initiates the final pulse of single-shot-circuit 59 to complete the shift from the 3 bit register to the 12 bit register. The pulse from single-shot-circuit 55 is fed through line 60 to the motor stop control circuit for a purpose to be described in conjunction with FIG. 10.

It can be seen that it will take 4 octal numbers to fill the 12 bit binary storage register. Thus, by depressing additional keys sequentially, the additional numbers may be fed into the register. Such an arrangement provides for selection of up to 2,048 different addresses with 11 bits allowing the 12 bit to be used for the selection of a discrete address. Alternatively, the 12 bit may be used for an analog address so that a selection of up to 4,096 different addresses may be made. In this case, any of the meter faces may be used for a plurality of discrete readings, with the discrete lights 17 being switched on by a 13th bit placed on the film address for that meter face which will switch in a circuit controlled by a 13 photo diode 39 within housing 40. Of course, the galvanometer circuit would be switched out at the same time. The discrete readings can be provided only when the multiplexer or other data source provides digital information to a digital to analog converter, as shown in the dotted line portion of FIG. 1, in order to provide 8 discrete inputs. This operation will be more clearly understood from the description of FIG. 6 below. If more than 4,096 addresses are needed, it will be necessary to go to a 5 bit octal address and to use a larger shift register. Of course, all addresses need not be used. The number of meter faces and addresses may be increased by splicing them into the film strip or decreased by cutting them out of the film strip.

Figure 6:
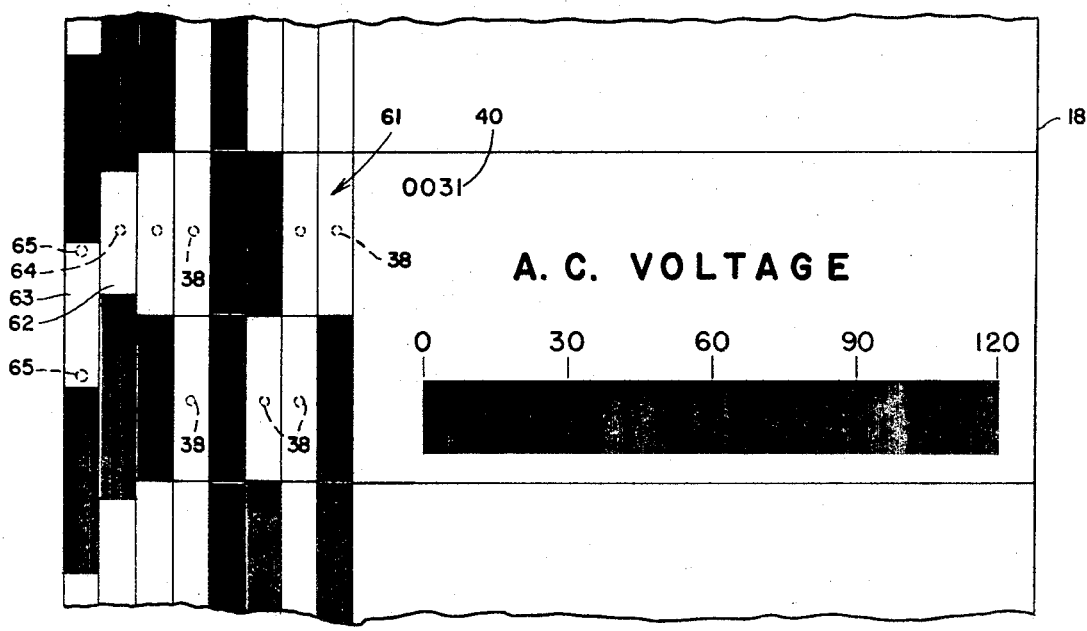
FIG. 6 is an enlarged elevation of a portion of film strip showing the address markings thereon and the manner in which they cooperate with the photo diodes to produce a signal indicative of the film position.

As shown in FIG. 6, each meter face on the film normally has associated with it a 12 bit binary code or address 61 plus a relatively short strobe or read bar 62 for determining when the 12 bit binary code should be read and a centering bar 63 for centering the meter face on the screen. Each light bar represents a binary "1" and each black bar represents a binary "0." The small dotted circles under the address represent the position of the photo diodes 38 with respect to the image projected upon screen 16. If desired, address 61 could be provided with a 13th bit for discrete readings as discussed above. Also, strobe diode 64 and centering diodes 65 are located as shown relative to the projected image. The strobe bar 62 is made somewhat narrower than the bars of code 61 so that the addresses will not be read while the film strip is between positions. The light portion of centering bar 63 is shorter than the dark portion so that it is not possible for the two centering diodes 65 to straddle a dark portion indicating that the film is centered when it is not.

Figure 7:
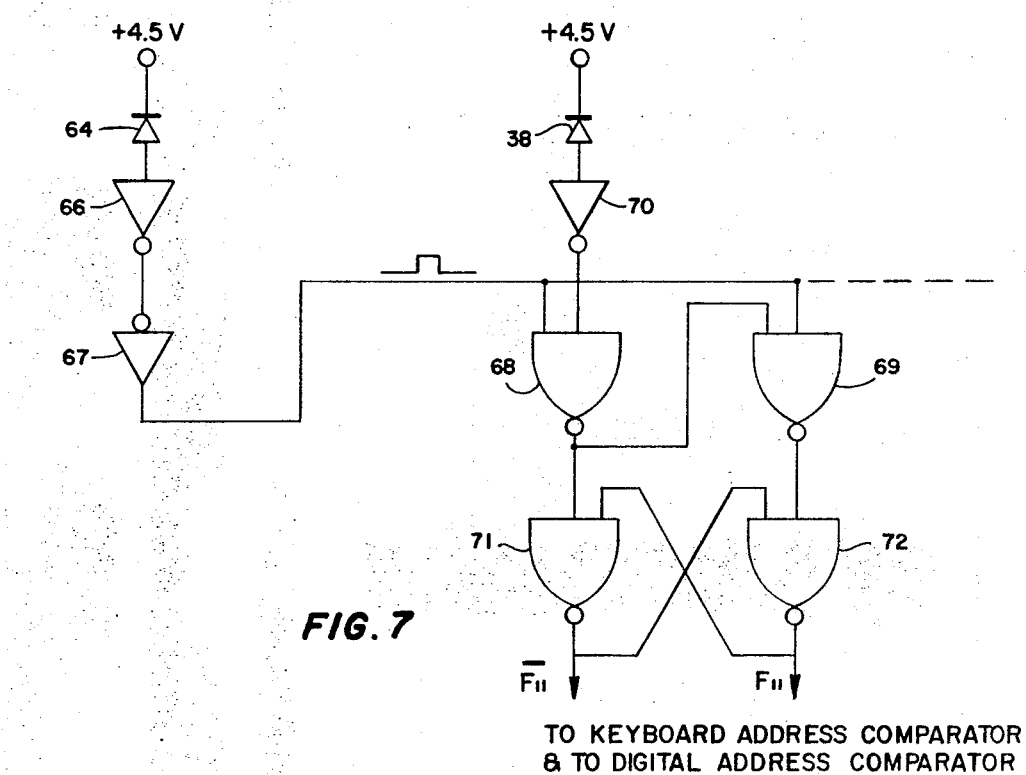
FIG. 7 is a circuit diagram of the film read register utilized in conjunction with this invention.

From the film read circuit of FIG. 7, it can be seen that strobe diode 64, through amplifiers 66 and 67, will enable the AND address gates, such as AND gates 68 and 69, to allow the address reading from the address diodes 38 to be transferred via amplifier 70 and AND gates 68 and 69 into the address register as represented by AND gates 71 and 72. However, when a different address is punched into the keyboard 29, as the film 18 begins to move toward the new address the strobe diode 64 will be deactivated before the address photo diodes 38 thereby disabling the address AND gates 68 and 69 so that the last address is held in the register represented by AND gates 71 and 72 until strobe diode 64 is activated by a new address. Thus, when the light hits the strobe diode 64, it becomes a low resistance and supplies current to a high gain amplifier 67. The signal is inverted by amplifier 67 and provides binary "1" or high signal to the AND gates 68 and 69 as well as other AND gates which are associated with the other photo diodes (not shown). When the input to these AND gates from the strobe diode 38 is a binary "1" the cross coupled AND gate flip-flop register 71, 72 is set. On the other hand, if a binary "0" or low signal is received from photo diode 38, the register will not be set. In this manner, it can be seen that the register for each of the photo diodes 38 will be set or not set, depending on whether binary "0" or a binary "1" is seen by the photo diodes 38 as they read the address 61 on film strip 18. However, when another address has been punched in the keyboard 29 causing the film strip to move to another meter face, a dark strip will move across the strobe diode 64 so that it sees a binary "0," and the reading in register 71, 72 will remain there until another binary "1" is seen by the strobe diode. Of course, the information stored in the film read register of FIG. 1 will then be transferred to the keyboard address comparator of FIG. 8, as indicated in FIG. 1.

The keyboard address comparator of FIG. 8 compares the address in the keyboard register of FIG. 1 to the address in the film register and provides the signal inputs to the motor control circuit of FIG. 10 to drive the motor, and hence the film, in one direction or the other. From FIG. 8, it can be seen that each stage of the keyboard address comparator consists of two AND gates such as AND gates 73 and 74. The input from the keyboard register is represented as Q and $\bar{Q}$ and the input from the film read register is represented as F and $\bar{F}$. The AND gates 73 and 74 are connected to an inhibit gate, such as OR gate 75 and inverter 76, as shown. Thus, the comparison is made of the most significant bit first and if Q does not equal F then the remaining comparators are inhibited. Referring to the truth table of FIG. 9, it can be seen that if Q and $\bar{F}$ are each a binary "1" then the output signal from AND gate 73 is low, a low input is provided to OR gate 77 which is connected through line 78 to the motor control circuit 79 of FIG. 10 to drive the motor 31 and the film 18 in one direction. On the other hand, if F and $\bar{Q}$ are each a binary "1," then the output of AND gate 74 is low providing a low input to OR gate 80, connected by line 81 to motor control circuit 79 causing the motor and film to be driven in the other direction. Also, if the output from either AND gate 73 or AND gate 74 is low, then the output from inverter 76 will be low which will inhibit AND gates 82 and 83 of the next comparator section. This comparator section includes an OR gate 84 and an inverter 85, as shown, and works the same as the previous section, sending a signal to the next comparator section only when the output from inverter 85 is high. The purpose of this arrangement is so that OR gates 77 and 80 do not get a signal to move in one direction from one bit comparison and a signal to move in the opposite direction from another bit comparison, simultaneously.

When the two inputs F and Q are the same, i.e., either a binary "0" or a binary "1," the output of AND gates 73 and 74 will both be high so that no signal is sent to OR gates 77 or 80 to initiate the motor drive. Also, the next comparator stage will be enabled through AND gate 75 and the inverter 76 and a comparison as described above will be made. This process will continue down the line through each bit comparison until all bits have been compared. When the last bit is compared the centering control gates are enabled and the left-right signals are furnished by the centering photo diodes 65 until both diodes are in centering bar 63 of FIG. 6. Photo diodes 65 provide signals through inverters 86 and 87 to flip-flop circuit comprising AND gates 88 and 89 as shown. The output from AND gates 88 and 89 is supplied to OR gates 77 and 80 to control the movement of the motor during centering and to OR gate 90 which is connected by line 91 to motor control circuit 79 of FIG. 10, as shown, to control the motor speed by conventional means (not shown) which are part of the motor control circuit 79.

The various motor control circuits are clearly shown in FIG. 10 which are provided here for stopping the motor when a wrong address is punched into the keyboard or the end of the film is reached and for starting the motor when the select switch is closed, as well as means to prevent the motor from running until the complete address has been punched into keyboard 29.

If an invalid address is punched into the keyboard, i.e., an address which is between two valid addresses, in a situation where all possible addresses are not in use, the motor drive circuit would continue reversing back and forth between the two valid addresses trying to find the one that is missing. To prevent this continued reversal, the reversing signal is fed through an OR gate 92 into a 3-bit counter comprising flip-flops 93, 94 and 95 which are interconnected, as shown, and are connected to the motor control circuit 79. The number of reversals necessary to stop the motor is arbitrary. However, in the circuit shown, when seven reversals have been made, the flip-flop circuits all contain a binary "1" which satisfy the three input AND gate 96 clearing the motor start flip-flop which includes two AND gates 97 and 98 thereby stopping the motor by breaking the circuit between the select switch and motor control circuit 79. Also, the output of AND gate 96 is connected through a flip-flop, which includes AND gates 99 and 100, and AND gate 101 to OR gate 102, which is connected to the base of transistor 103 and completes the circuit to a no-valid-address light 104 which is turned on so that the operator realizes that he has punched an incorrect address. The other input to AND gate 101 is supplied through line 91 from the centering circuit.

To prevent the film from running off the spools 19 and 20 at either end, a section of film is provided at one end with an address in which each of the 12 bits is a binary "1" and the other end is provided with an address in which each of the 12 bits is a binary "0." A group of these addresses are put on each end of the film and read by two AND gates. For example, AND gate 105 may be provided for the binary "1" end of the film and AND gate 106 may be provided for the binary "0" end of the film. Each gate is provided with twelve inputs, one for each bit on the film address. If the film drive is driven beyond the normal addresses, one of these gates will be satisfied, clearing flip-flop 97, 98 to stop the motor. It will be noted that both AND gates 105 and 106 are also connected into OR gate 102 so that the no-valid-address light 105 will be lit up.

In addition, it is desirable to prevent the motor from running while an address is being punched into the keyboard 29. To prevent this, the flip-flop circuit 97, 98 is cleared by the first pulse through line 60 from the shift OR gate 54 of FIG. 5. This disables the motor drive circuit. After the complete address has been punched in, the select key is depressed to reset flip-flop 97, 98 and allow the motor to run so that the correct address may be found and the proper meter face displayed on screen 16.

For high operation speed, the motor may be driven at different speeds in order to reach the desired address in the minimum amount of time. The circuitry for this is not illustrated, but it will be understood that after the desired address is shifted into the keyboard 29 and the select switch is closed, the motor will always start at high speed, driving the film toward the correct address. Since the motor is running in high speed, the film will overshoot the correct address and the first address after the correct address will result in a reverse signal to the motor control circuit 79. At the same time, a flip-flop within circuit 79 is cleared, causing the motor to go to medium speed in reverse. The film is now driven at medium speed back to the correct address and then at slow speed until the meter face is centered by centering diodes 65. However, small errors in centering will not affect the accuracy of the readings since the scale is placed at right angles to the length of the film strip, as shown in FIG. 6. Thus, the accuracy of positioning of the scale on the screen is dependent on the machine tolerances of film guide 25 and the accuracy of placement of the meter scales on the film strip.

After the film has been centered on the desired meter face, the address on the film is compared with the data stream address of the programmer by means of the digital address comparator of FIG. 1. If, at the time a transfer pulse is initiated from the programmer to the sample and hold circuit and all of the address bits coming in from the data stream address are identical, bit for bit, to the address in the film read register, as compared by the digital address comparator, a flip-flop (not shown) will be set in the sample and hold circuit to allow a data sample from the data pulses to be read into the sample and hold circuit. When the next transfer pulse arrives the flip-flop will be cleared, disconnecting the data pulses from the sample and hold circuit. The previous data sample, however, will be held in the sample and hold circuit, and updated as described below, until a different address has been punched into the keyboard. The bit by bit comparison within the digital address comparator is made by a set of exclusive OR gates (not shown), one gate being provided for each bit. The output of all the exclusive OR gates are fed into an AND gate within the sample and hold circuit along with the transfer pulse from the programmer. If the output of all of the exclusive OR gates is high when the transfer pulse occurs, the flip-flop in the sample and hold circuit will be set. If any one of the outputs is low, then the addresses do not match and the flip-flop is not set. The sample and hold circuit always holds the last reading or data sample it has received and provides a signal to mirror galvanometer 44 which causes it to rotate an amount proportional to this data sample to project a light beam 46 onto screen 16, as described above, giving a reading for the particular meter face being displayed on the screen.

Advantageously, the meter reading being displayed will be updated continually until a different address is punched into the keyboard. Every time the data stream address matches the selected address, the sample and hold circuit will read and store the data sample from the data pulses and update the meter reading. The more critical parameters may be sampled as often as 400 times per second, for instance, whereas the less critical parameters may be sampled only two times per second or so. The frequency of sampling is built into the programmer.

From the foregoing, it can be seen that the novel objects and features of this invention have been fulfilled to a marked degree. An integrated parameter display has been provided for operation with a conventional programmer and multiplexer in which a virtually unlimited number of meters may be displayed by placing the meter faces on a film strip for projection onto a screen. The meter reading is obtained by utilizing a galvanometer for projecting an image onto a screen to give a visual indication of the value of the parameter being measured. The meter faces are placed on a film strip with a coded address adjacent thereto. The desired address is punched into a keyboard and compared with the film address, the film strip being driven until the selected address matches the address adjacent the displayed meter. The film strip can be moved rapidly to change the meter faces, means being provided to assure that the wrong meter face is not displayed, whereby the address number is placed on the meter face so that the operator can tell whether or not the meter face being displayed is the one he intended. In addition, means is provided for updating each meter reading at preselected intervals and this interval may vary for the particular parameter being monitored. Conveniently, additional meter faces may be added to the film strip or meter faces may be taken off the film strip as required. Furthermore, the readings may be given in either analog or discrete readings.

What is claimed is:

1. An integrated parameter display adapted to be connected into a programmer and multiplexer, including:
means for displaying any one of a plurality of meter faces, each meter face having a binary address adjacent thereto;

an address selector for selecting the address of a meter face to be displayed;

means for comparing the selected address with the address of the meter being displayed;

means responsive to any difference in said selected address and said meter address to cause said displaying means to pick out and display the selected meter face;

means comparing the selected address with a data stream address from said programmer for selecting a data sample from the data pulses from said multiplexer; and a galvanometer responsive to said data sample providing a reading on said selected meter face proportional to said data sample.

2. An integrated parameter display, as set forth in claim 1, wherein said meter faces and their respective addresses are mounted on a film strip and said displaying means includes:

a display screen;

a photo diode array mounted adjacent said screen and connected to said responsive means;

means for projecting an image of said selected meter face and said address on said screen and said photo diode array, respectively, initiating a signal to said responsive means to drive said film strip so that said selected meter is displayed.

3. An integrated parameter display, as set forth in claim 2, wherein said galvanometer is a mirror galvanometer and further including:

means projecting a bar of light, said light bar being reflected by said mirror galvanometer onto said selected meter face image to provide said reading.

4. An integrated parameter display adapted to be connected into a programmer and multiplexer, including:

a projector having film drive means;

a display screen;

a photo diode array mounted adjacent said display screen, said projector being adapted to project an image of any one of a plurality of meter faces and their respective binary addresses onto said screen and said photo diode array, respectively;

a keyboard address selector and register adapted to receive a digital address and store it as a binary address;

a film read register responsive to a signal from said photo diode array adapted to store the binary address read by said array from the binary address image of the meter face image being projected onto said screen;

a keyboard address comparator for comparing the binary address in said keyboard register with the binary address in said film read register and providing a signal to said projector when the addresses do not match to cause said film drive means to drive the film to a position where the addresses do match;

a digital address comparator for comparing the data stream address from said programmer with the address stored in said read register;

means receiving data pulses from said multiplexer and a transfer pulse from said programmer, said data pulse receiving means receiving and holding a data sample from said pulse upon receiving a signal from said digital address comparator whenever said data stream address matches said film read register address and a transfer pulse is received from said programmer;

means responsive to said data sample in said data pulse receiving means for indicating a value on said meter face image proportional to said data sample.

5. An integrated parameter display, as set forth in claim 4, wherein said responsive means includes:

means for projecting a bar of light; and a mirror galvanometer responsive to said data sample in said data pulse receiving means for reflecting said light bar onto said meter face for indicating said value proportional to said data sample.

6. An integrated parameter display, as set forth in claim 4, wherein said photo diode array includes:

a plurality of address diodes;

a strobe diode, electrically connected with said address diodes, which senses images of indicia on the film strip to disable said address diodes when said film is between addresses.

7. An integrated parameter display, as set forth in claim 4, wherein said photo diode array includes:

a pair of centering diodes, electrically connected to said drive means, which sense images of indicia on the film to cause said drive means to center said meter face image on said screen.

8. An integrated parameter display, as set forth in claim 4, wherein said data pulse receiving means includes a sample and hold circuit for receiving analog pulses from said multiplexer.

9. An integrated parameter display, as set forth in claim 4, wherein said data pulse receiving means includes a digital to analog converter for receiving digital pulses from said multiplexer.

10. A method of displaying code addressed meter faces individually of any of a plurality of measured parameters comprising:

selecting the address of a meter face to be displayed;

comparing the selected address with the addresses of all the meter faces;

displaying the correct meter face;

comparing the selected address with a data stream address from a programmer;

taking a data sample from data pulses from a multiplexer connected to said programmer each time said selected address matches said data stream address; and displaying a reading on said selected meter face proportional to said data sample.

11. A method, as set forth in claim 10, wherein said meter faces and their respective addresses are on a film strip, including the further steps of:

driving said film strip back and forth to compare said selected address with said film addresses;

stopping said film strip when said selected address and said film address match; and projecting an image of the correct meter face.

References Cited

UNITED STATES PATENTS 3,445,814  5/1969  Spalti _____ 340—151

HAROLD I. PITTS, Primary Examiner

U.S. Cl. X.R.

340—147, 149, 150, 163